(12) United States Patent
Bannister et al.

(10) Patent No.: US 9,986,033 B2
(45) Date of Patent: May 29, 2018

(54) FACILITATING ACCESS TO REMOTE CLOUD SERVICES

(71) Applicant: Panzura, Inc., Campbell, CA (US)

(72) Inventors: Greig W. Bannister, Allambie Heights (AU); John Richard Taylor, Tiburon, CA (US)

(73) Assignee: Panzura, Inc., Campbell, CA (US)

( * ) Notice: Subject to any disclaimer, the term of this patent is extended or adjusted under 35 U.S.C. 154(b) by 0 days. days.

(21) Appl. No.: 14/660,479

(22) Filed: Mar. 17, 2015

(65) Prior Publication Data

US 2016/0277497 A1    Sep. 22, 2016

(51) Int. Cl.
*H04L 29/08* (2006.01)
*H04L 29/06* (2006.01)
*H04L 29/12* (2006.01)

(52) U.S. Cl.
CPC ........ *H04L 67/1097* (2013.01); *H04L 61/103* (2013.01); *H04L 61/2007* (2013.01); *H04L 61/6022* (2013.01); *H04L 61/6068* (2013.01); *H04L 63/0272* (2013.01); *H04L 67/1036* (2013.01)

(58) Field of Classification Search
CPC ............. H04L 67/1097; H04L 63/0272; H04L 67/1036; H04L 67/42
See application file for complete search history.

(56) References Cited

U.S. PATENT DOCUMENTS

| | | | | |
|---|---|---|---|---|
| 8,577,842 B1* | 11/2013 | Nagargadde | ........ | G06F 11/1464 707/639 |
| 8,997,198 B1* | 3/2015 | Kelley | .................... | H04L 63/06 726/10 |
| 9,251,114 B1* | 2/2016 | Ancin | ............... | G06F 15/17331 |
| 2002/0133491 A1* | 9/2002 | Sim | .................... | G06F 17/30067 |
| 2010/0161759 A1* | 6/2010 | Brand | ................. | H04L 67/1097 709/218 |

(Continued)

OTHER PUBLICATIONS

Arumugam et al., Virt Cache Managing Virtual Disk Performance Variation in Distributed File Systems for the Cloud, IEEE, Cloud Computing Technology and Science (CloudCom), 2014 IEEE 6th International Conference on, Dec. 2014, pp. 210-217 (Year: 2014).*
Dong et al, HVSTO: Efficient privacy preserving hybrid storage in cloud data center, IEEE, Computer Communications Workshops (INFOCOM Wkshps), 2014 IEEE Conference on , May 2014, pp. 529-534 (Year: 2014).*

(Continued)

*Primary Examiner* — Luu T Pham
*Assistant Examiner* — Harvey I Cohen
(74) *Attorney, Agent, or Firm* — Park, Vaughan, Fleming & Dowler LLP; Mark Spiller

(57) ABSTRACT

The disclosed embodiments disclose techniques for facilitating access to a remote cloud service via a cloud controller for a distributed filesystem. Two or more cloud controllers collectively manage distributed filesystem data that is stored in the cloud storage systems; the cloud controllers ensure data consistency for the stored data, and each cloud controller caches portions of the distributed filesystem. During operation, a cloud controller detects a request from a co-located client to access a network address that is in the same subnet of their local network. The cloud controller determines that the network address is associated with the remote cloud service (which executes in a cloud storage environment) and forwards the request to the remote cloud service.

20 Claims, 9 Drawing Sheets

(56) References Cited

U.S. PATENT DOCUMENTS

| | | | | |
|---|---|---|---|---|
| 2012/0110055 A1* | 5/2012 | Van Biljon | ............ | G06Q 30/04 |
| | | | | 709/201 |
| 2014/0025770 A1* | 1/2014 | Warfield | ........... | G06F 15/17331 |
| | | | | 709/213 |
| 2014/0359050 A1* | 12/2014 | Butt | .................. | G06F 15/17331 |
| | | | | 709/214 |
| 2015/0100357 A1* | 4/2015 | Seese | ................. | G06Q 10/0631 |
| | | | | 705/7.12 |
| 2015/0193466 A1* | 7/2015 | Luft | ................. | G06F 17/30194 |
| | | | | 707/634 |
| 2015/0324386 A1* | 11/2015 | Calder | ............. | G06F 17/30876 |
| | | | | 707/649 |
| 2016/0072889 A1* | 3/2016 | Jung | .................. | H04L 67/1097 |
| | | | | 709/219 |

OTHER PUBLICATIONS

Amokrane et al, Greenhead: Virtual Data Center Embedding across Distributed Infrastructures, IEEE Transactions on Cloud Computing ( vol. 1, Issue: 1, Jan.-Jun. 2013 ), Sep. 2013, pp. 36-49 (Year: 2013).*

He et al., Study on Cloud Storage System Based on Distributed Storage Systems, IEEE, Computational and Information Sciences ICCIS), 2010 International Conference on, Dec. 2010, pp. 1332-1335 (Year: 2010).*

Kleineweber et al., QoS-aware storage virtualization for cloud file systems, ACM, Proceeding PFSW'14 Proceedings of the 1st ACM International Workshop of Programmable file systems, pp. 19-26, Jun. 2014 (Year: 2014).*

* cited by examiner

FACILITATING ACCESS TO REMOTE CLOUD SERVICES

BACKGROUND

Field of the Invention

This disclosure generally relates to techniques for providing flexible and extensible network storage systems. More specifically, this disclosure relates to techniques for storing and collaboratively accessing data in a distributed filesystem.

Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments disclose techniques for facilitating access to a remote cloud service via a cloud controller for a distributed filesystem. Two or more cloud controllers collectively manage distributed filesystem data that is stored in the cloud storage systems; the cloud controllers ensure data consistency for the stored data, and each cloud controller caches portions of the distributed filesystem. During operation, a cloud controller detects a request from a co-located client to access a network address that is in the same subnet of their local network. The cloud controller determines that the network address is associated with the remote cloud service (which executes in a cloud storage environment) and forwards the request to the remote cloud service.

In some embodiments, the remote cloud service is not co-located with the local cloud controller and client. However, forwarding the request from the local cloud controller to the remote cloud service facilitates an abstraction for the client that the remote cloud service is present in the local network and co-located with the local cloud controller and the client. For instance, the client can then configure the remote cloud service as if the remote cloud service was a local service executing in the local network.

In some embodiments, one or more cloud storage systems that store data for the distributed filesystem are hosted in the same cloud storage environment as the remote cloud service.

In some embodiments, the local cloud controller facilitates forwarding requests to the remote cloud service by: (1) instantiating a remote cloud controller in the cloud storage environment (e.g., as a virtual machine); (2) establishing a virtual private network (VPN) between the local cloud controller and the remote cloud controller; and (3) instantiating the remote cloud service in the cloud storage environment.

In some embodiments, forwarding the request from the local cloud controller to the remote cloud service involves: (1) determining an available sub-subnet address space within the subnet of the local network; (2) allocating the sub-subnet address space to one or more remote cloud services; and (3) configuring the local cloud controller to perform bridging for the sub-subnet address space. For instance, upon detecting a request that was sent to the sub-subnet address space, the local cloud controller may be configured to forward the request to the remote cloud controller, which then forwards the request to the remote cloud service.

In some embodiments, the local cloud controller is configured to detect an address resolution protocol (ARP) request for the network address. The local cloud controller sends its own link layer address in response to this request, thereby ensuring that subsequent requests to the remote cloud service from the local network are directed to the local cloud controller.

In some embodiments, forwarding the request from the local cloud controller to the remote cloud service involves: (1) determining an available network address in the same subnet of the local network; (2) allocating the available network address to the remote cloud service; (3) maintaining in the local cloud controller a mapping for local network addresses that are associated with remote cloud services; and (4) upon detecting a request to such local addresses, forwarding the request to the remote cloud controller, which then forwards the request to the target remote cloud service.

In some embodiments, the remote cloud service can leverage the low-latency, high-bandwidth network of the cloud storage environment to execute data-intensive tasks in proximity to the one or more cloud storage systems and the remote cloud controller. Executing data-intensive tasks in the cloud storage environment (instead of in the local network) facilitates reducing network traffic on a network link between the local network and the one or more cloud storage systems.

In some embodiments, the remote cloud controller is configured with the same network address as the local cloud controller. Consider a scenario in which the remote cloud service initiates a filesystem access request for the distributed filesystem. In this scenario, the remote cloud service sends a fileserver request to a network directory in order to find a local fileserver that it can access for file access requests. The network directory may incorrectly determine (because of the bridging, based on the network address of the remote cloud service) that the remote cloud service is co-located with the local cloud controller, and thus return the network address of the local cloud controller to the remote cloud service (which in reality is not co-located with the remote cloud service). However, because the remote cloud controller has been allocated the same network address as the local cloud controller, the remote cloud controller receives any subsequent file access requests that are sent by the remote cloud service, and can proceed to provide file services for the distributed filesystem to the remote cloud service.

In some embodiments, the local cloud controller and the network directory are configured to share a shared secret. The local cloud controller shares this shared secret with the remote cloud controller. In response to the filesystem access request, the network directory also returns an authentication identifier to the remote cloud service in addition to the network address. The remote cloud service sends this authentication identifier in its file access request to the network address of the provided cloud controller, and the remote cloud controller then uses the shared secret to decrypt and validate the authentication identifier.

In some embodiments, the local cloud controller does not share the shared secret with the remote cloud controller. Instead, the remote cloud controller is configured to send any authentication identifiers received in file access requests to the local cloud controller. The local cloud controller uses the shared secret to decrypt and validate the authentication identifier, and then sends the decrypted authentication identifier to the remote cloud controller.

DETAILED DESCRIPTION

Figure 1A:
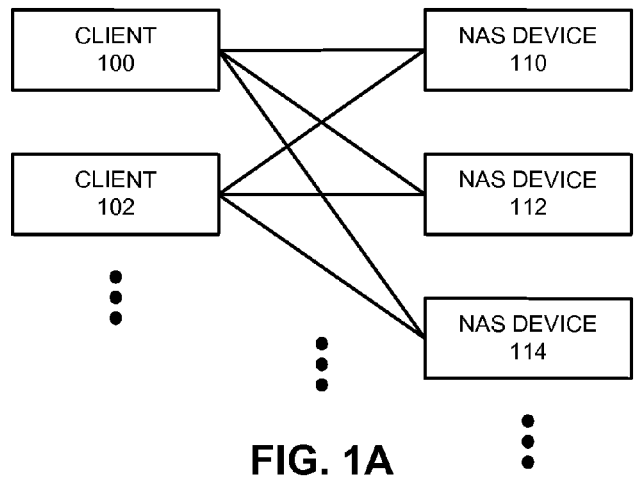
FIG. 1A illustrates a set of clients that are configured to access NAS devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets has motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts. Storage systems typically need to be architected very carefully based on expected client needs, application needs, and load characteristics.

Figure 1B:
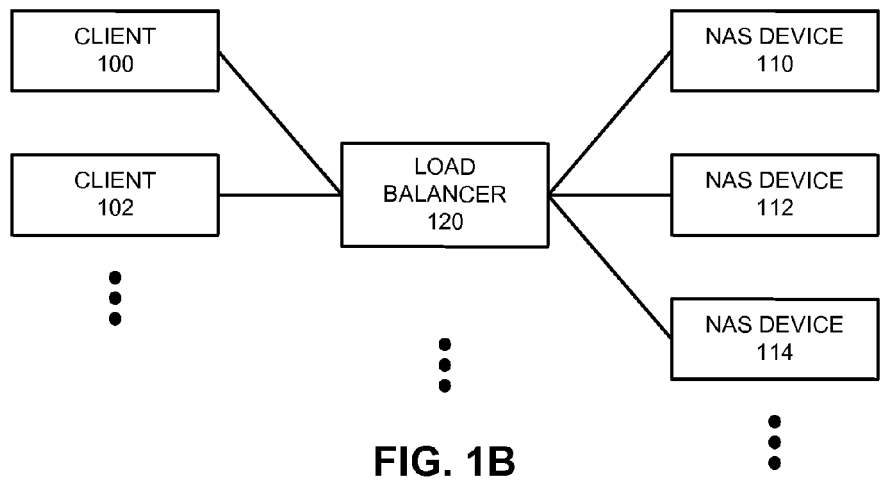
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
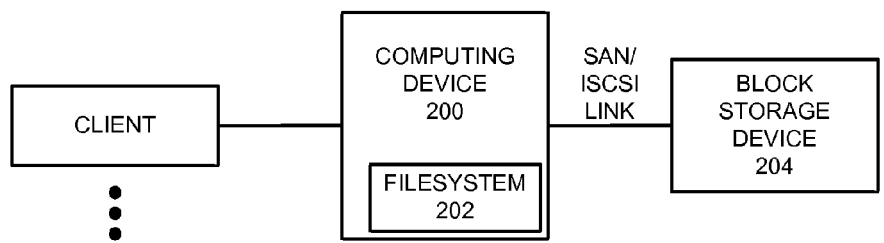
FIG. 2 illustrates a network storage system that provides remote storage with a disk-level abstraction.

FIG. 2 illustrates another network storage system that provides remote storage, but with a disk-level abstraction. In such an architecture, a computing device 200 manages metadata for a filesystem 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and metadata to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem metadata on behalf of filesystem 202, but it is filesystem 202 that provides the higher level of abstraction to the operating system of computing device 200.

A number of "cloud-based storage" vendors (also sometimes referred to as "cloud storage providers") attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Consider a scenario where one remote client attempts to write a set of data to a cloud storage system, and a second remote client attempts to read the data that is being written. In some systems, a reader may not be able to see the existence of newly written file data until the entire write operation has completed (e.g., after the first remote client has closed the file). In other (non-data-consistent) arrangements, the reader may see and access the file, but because writes are stateless and potentially out-of-order (e.g., as in the Network File System (NFS) protocol), does not know which file sections have already been written, and hence may access a mix of valid data and garbage.

Embodiments of the present invention combine aspects of NAS capabilities and cloud-based storage capabilities to provide a high-capacity, high-reliability storage system that enables data to be accessed at different levels of consistency, thereby improving performance without negatively affecting application behavior.

Providing Data Consistency in a Cloud Storage System

In some embodiments, a set of caching storage devices (referred to as "cloud controllers") collectively cache, manage, and ensure data consistency for a set of data that is stored in a network storage system (e.g., a cloud-based storage system, which is also referred to as a cloud storage system). More specifically, one or more cloud controllers work together (e.g., as a federation) to manage a distributed filesystem with a global address space. Each cloud controller maintains (e.g., stores and updates) metadata that describes the file and directory layout of the distributed filesystem and the location of the data blocks in the cloud storage system. Each cloud controller can also cache a subset of the data that is stored in the cloud storage system. A cloud controller that writes (or modifies) data ensures that: (1) data changes are reflected in the cloud storage system; and (2) other cloud controllers in the system are informed of file and metadata changes.

Note that while the cloud storage system stores the data for the distributed filesystem, the cloud storage capabilities may be provided by an external vendor. An enterprise storing sensitive data in the distributed filesystem may not want this vendor to be able to access such data, and hence, the cloud storage system may be configured to store the distributed filesystem's data in the form of encrypted storage volumes (referred to as "cloud files" or "drive files"). This configuration enhances data security, but also prevents the cloud storage system from actively assisting in ensuring data consistency and performing other operations that require knowledge of the data and data layout. More specifically, in some embodiments the cloud controllers fully manage the filesystem and manage data consistency, with the cloud storage system providing purely storage capabilities.

Figure 3:
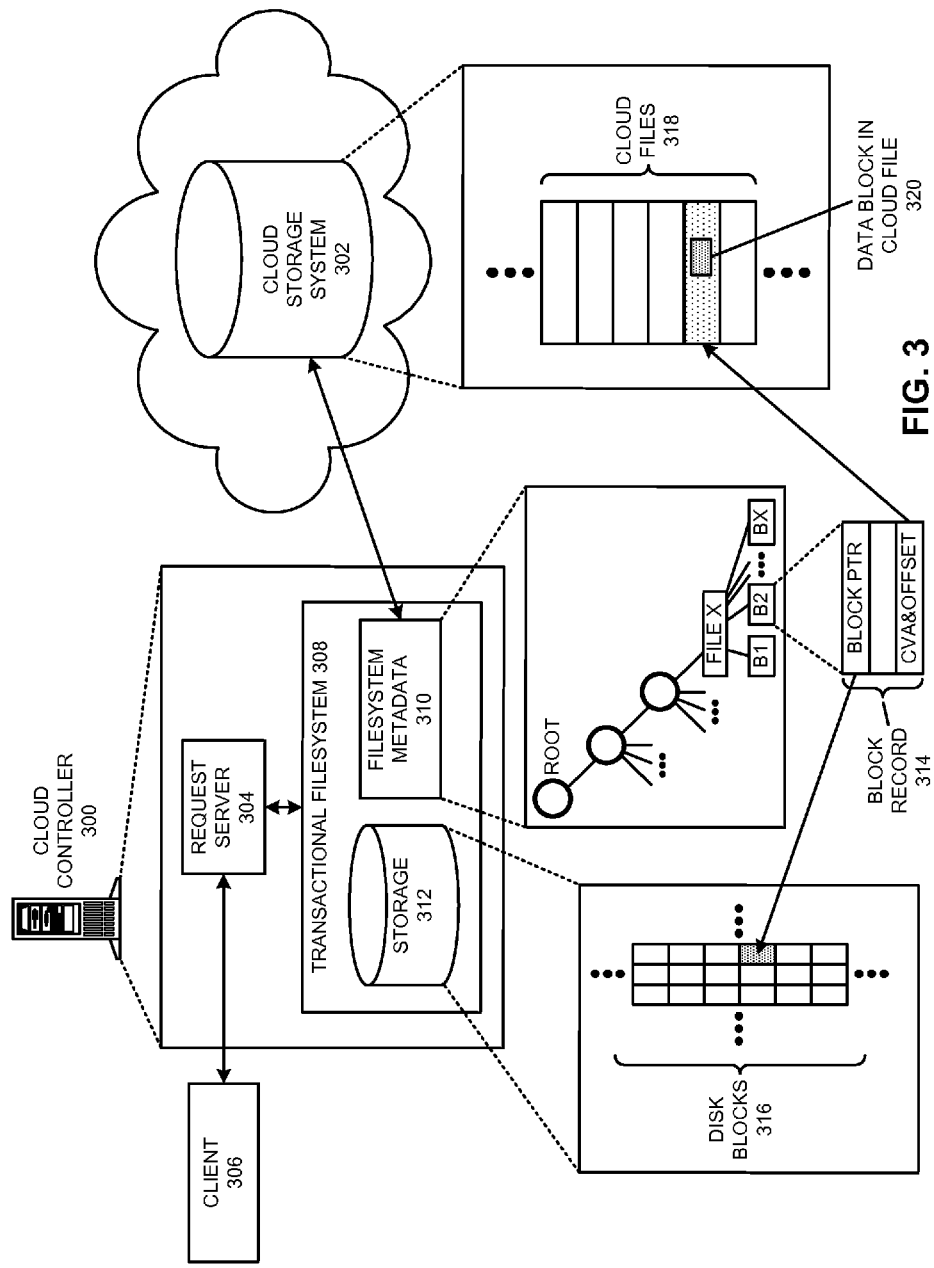
FIG. 3 illustrates an exemplary system in which a cloud controller manages and accesses data stored in a cloud storage system in accordance with an embodiment.

FIG. 3 illustrates an exemplary system in which a cloud controller 300 (e.g., a caching storage device) manages and accesses data stored in a cloud storage system 302. A request server 304 in cloud controller 300 may receive file requests from either local processes or via a network from a client 306. These requests are presented to a storage management system that includes a transactional filesystem 308 that manages a set of filesystem metadata 310 and a local storage system 312. In FIG. 3, the filesystem structure defined by metadata 310 is illustrated as a tree of pointers that define one or more levels of directories and files residing in directories. Each file is described using a set of ordered metadata structures that indicate the set of disk blocks that contain the file's data. A set of block records 314 in metadata 310 include pointer fields that indicate the location of the file data in a disk block 316 in local storage 312 (if the given block is currently being cached in the storage 312 of cloud controller 300), as well as the location of the file data in a cloud file 318. Note that disk blocks 316 and cloud files 318 may have substantially different sizes. For instance, cloud files might be much larger than disk blocks, and hence the data contained in a disk block 316 may occupy only a portion of a cloud file 320. Hence, one pointer field in block record 314 may consist of a block pointer (labeled "BLOCK PTR" in FIG. 3) that points to a specific disk block, while another field (labeled "CVA&OFFSET") may include both a pointer to a cloud file (also referred to as a "cloud virtual address," or CVA) and an offset into the cloud file.

Note that using a transactional filesystem in each cloud controller does involve some additional overhead. As described above, the transactional filesystem tracks modifications using delta encoding (instead of the more typical read/copy/modify operations used in many non-data-consistent filesystems). For instance, consider a 1 KB modification to an existing 3 KB file in a filesystem that supports 4 KB blocks. Using a traditional approach, the filesystem might read out the original 4 KB block, modify the block to reflect the updates, and then write the modified file back to the same block. In contrast, in a transactional filesystem, the original block is left unchanged, and the filesystem writes out the modifications and additional data to another empty 4 KB block. The metadata for the transactional filesystem is extended to support the notion of partial blocks and deltas (e.g., including one pointer that points to 3 KB of data in one block and another pointer that points to another block that contains 1 KB of additional data and a set of changes that should be applied to the initial 3 KB of data).

In some embodiments, using a transactional filesystem (e.g., transactional filesystem 308 in FIG. 3) in a cloud controller facilitates providing ongoing incremental snapshots of changes to a cloud storage system and other cloud controllers. More specifically, the transactional nature (e.g., the delta encoding of changes) can be extended to include a set of additional metadata structures that track recently changed data in the cloud controller. These additional metadata structures can then be used to quickly and efficiently construct compact snapshots that identify file metadata and file data that has changed due to recent write operations. Note that these snapshots do not involve copying a full set of metadata and/or every byte that was previously written for a file; instead, such snapshots compactly convey only the set of changes for the data set. Sending only a compact set of changes facilitates maintaining data consistency while minimizing the amount of data (and metadata) that needs to be transferred and processed. Sending frequent snapshots ensures that changes are quickly propagated to other cloud controllers and the cloud storage system.

In some embodiments, cloud controllers generate separate metadata snapshots and file data snapshots. Metadata is typically much smaller than file data, and is needed to access file data. Furthermore, each cloud controller is typically configured to maintain (and update) the full set of metadata, but only caches file data that is needed by local clients. Hence, uploading (or sending) a metadata snapshot separately means that the updated metadata will be more quickly available to other peer cloud controllers. Each of these peer cloud controllers can then determine (e.g., based on client data usage and needs) whether to access the related file data associated with the updated metadata. Note that a cloud controller may still upload both metadata updates and file data updates to the cloud storage system, but may split them into different sets of cloud files (or both include the metadata with the file data as well as generate another separate, duplicative update that includes only metadata) so that other cloud controllers can access the two separately. In such an organization, a cloud controller might then send a message to other cloud controllers specifying the location of the stored metadata snapshot. Alternatively, cloud controllers may also be configured to send metadata snapshots directly to a set of peer cloud controllers.

In some embodiments, cloud controllers may use stored snapshot data to provide access to different versions of a file. For instance, when an existing file is being modified, a cloud controller may be configured to present a previous version of the file to clients until the complete set of data for the modified version is available in the cloud storage system. In some embodiments, cloud controllers may maintain records of past snapshots to allow file accesses to be rolled back across multiple different versions, thereby allowing clients to view historical versions of files and/or the changes made to files over time.

In some embodiments, each file in the distributed filesystem is associated with a cloud controller that "owns" (e.g., actively manages) the file. For instance, the cloud controller from which a file was first written may by default be registered (in the file block metadata) as the owner (e.g., the owning cloud controller) of the file. A cloud controller attempting to write a file owned by another cloud controller first contacts the owner with a request to lock the file. The owner can determine whether to grant or deny the lock request. In some embodiments, even if this request is granted, all write operations may be required to go through the cloud controller that owns the file (e.g., new data is written to the local filesystem of the owning cloud controller). Note that while every cloud controller actively manages a set of files, a given cloud controller may not need to continue to cache every disk block of files that it owns; once such blocks have been written to the cloud storage system, they may subsequently be cleared from the cloud controller to make space for other needed data. However, the metadata for all of the files in the distributed system is typically maintained in every cloud controller. In some embodiments, the system may also include mechanisms for transferring ownership of files between cloud controllers (e.g., migrating file ownership to cloud controllers that are the primary modifiers of the file to reduce network latency).

Using such techniques, cloud controllers can treat the cloud storage system as an object store. Other cloud controllers receiving metadata updates can then access data from cloud files as needed. Furthermore, a cloud controller that has uploaded data can, if needed, flush data that has been uploaded from its local filesystem (e.g., "clear its cache") to make space for other data that is more likely to be needed immediately. Note, however, that a cloud controller flushing data still keeps the accompanying metadata, so that the flushed data can be found and reloaded from the cloud storage system if needed again.

In general, the disclosed techniques leverage transactional filesystem techniques and snapshots to ensure that only valid data can be accessed. While these techniques involve some additional complexity, they also provide an assurance of data consistency for a distributed filesystem that leverages cloud storage. Additional techniques for using cloud controllers to manage and access data stored in a distributed filesystem are described in more detail in pending U.S. patent application Ser. No. 13/725,767, filed 21 Dec. 2012, entitled "Accessing Cached Data from a Peer Cloud Controller in a Distributed Filesystem," by inventors John Richard Taylor, Randy Yen-pang Chou, and Andrew P. Davis, which is incorporated by reference in its entirety.

Supporting Collaboration in a Distributed Filesystem

The previous sections describe a distributed filesystem in which distributed cloud controllers collectively manage (and provide consistent access to) file data that is stored in a remote cloud storage system. As described, each cloud controller maintains (and updates) a copy of the metadata for the files stored in the distributed filesystem, but only caches a subset of the data stored in the remote cloud storage system that is being accessed (or likely to be accessed) by the respective cloud controller's clients. These cloud controllers use file write locks to ensure that only a single client can write a file at a given time, and then ensure that file modifications are propagated to the remote cloud storage system (e.g., via incremental data snapshots and incremental metadata snapshots).

While the above-described techniques allow metadata and data to be synchronized across a large number of distributed cloud controllers, there may be some delay in propagating snapshots. Such delays may complicate real-time collaboration in scenarios where multiple clients that are distributed across multiple cloud controllers attempt to collaboratively edit and/or access the same files and/or directories. Techniques for reducing delays for collaborative file accesses in a distributed filesystem are described in more detail in pending U.S. patent application Ser. No. 14/298,496, filed 6 Jun. 2014, entitled "Managing Opportunistic Locks in a Distributed Filesystem," by inventors Yun Lin and John Richard Taylor, which is incorporated by reference in its entirety.

Synchronization Updates Between Cloud Controllers

In some embodiments, the cloud controllers of a distributed filesystem may be configured to selectively close the synchronization gap of bulk update techniques (such as incremental metadata snapshots) when needed by enabling additional direct transfers of data between two cloud controllers. Such techniques can be used to craft "metadata deltas" that support fast, granular interaction between two (or more) clients that are working on the same set of files via different cloud controllers. Such techniques can involve directly synchronizing changes between cloud controllers to propagate file modifications to collaborators more quickly and proactively pre-synchronizing related files, and are described in more detail in pending U.S. patent application Ser. No. 14/482,923, filed 10 Sep. 2014, entitled "Managing the Level of Consistency for a File in a Distributed Filesystem," by inventors Yun Lin, Steve Hyuntae Jung, Vinay Kumar Anneboina, and John Richard Taylor, which is incorporated by reference in its entirety).

Facilitating Access to Remote Cloud Services

In some embodiments, cloud controllers and additional data services can be executed in a virtual machine in a cloud storage environment (and thus be co-located with a cloud storage system). In a previous example this configuration was used to perform anti-virus scans for all of the data that is written to the distributed filesystem, as described in more detail in pending U.S. patent application Ser. No. 14/019,212, filed 5 Sep. 2013, entitled "Performing Anti-Virus Checks for a Distributed Filesystem," by inventors Richard Sharpe and Randy Yen-pang Chou, which is incorporated by reference in its entirety. Note that executing a cloud controller in a virtual machine in the data center of a cloud storage provider can provide a substantial range of benefits. For instance, such benefits can include (but are not limited to): (1) offloading filesystem operations from physical cloud controllers that provide client file services to distributed client sites reduces the load on these physical cloud controllers, thereby improving file performance for clients at those sites; (2) the virtual machine executing the virtual cloud controller does not require additional dedicated hardware at local sites and executes in the same data center as the cloud storage system, and hence can access data blocks stored in the cloud storage system via a very low-latency, high-bandwidth connection; (3) additional virtual clients that need to access the distributed filesystem may be configured to execute on the same server (and/or within the same data center), thereby also facilitating the rapid transfer of files and results between such services; (4) services and file operations that execute completely "in the cloud" (e.g., within the cloud storage provider environment) do not detract from the network resources used by the other cloud controllers or client sites that are associated with the distributed filesystem (beyond the receipt of an additional incremental metadata snapshots that result from any cloud-based operations that change distributed filesystem data); and (5) network and compute bandwidth within the cloud are often cheaper than the network bandwidth between client sites and the cloud storage system and compute cycles in physical cloud controllers—thus, an arrangement that reduces the load on an organization's wide-area network links and physical cloud controllers can reduce cost while increasing performance.

Unfortunately, remotely instantiating and managing virtual services in a cloud storage provider environment may sometimes involve substantial administrative and logistical overhead. More specifically, instantiating services to execute in a cloud-based environment typically involves configuring a new, independent network subnet in the context of the cloud environment, assigning internet protocol (IP) addresses that match the new subnet to the virtual machines, and then ensuring that network traffic can be routed between this remote subnet and any other enterprise networks that need to access the remote subnet. Such operations typically require interaction with a human network administrator. For instance, a network administrator may need to set up a VPN (virtual private network) or a physical cross-connect for one or more local enterprise networks that need to access the remote subnet, and then adjust layer-three (e.g., IP-layer) routing rules to ensure that traffic reliably reaches a target service executing in the remote subnet. For example, the network administrator may need to select and configure one or more dedicated local computing devices to host VPN tunnels and handle such routing. In general, initiating and managing a set of "cloud services" that operate in a completely independent network may involve substantial configuration effort and overhead.

In some embodiments, cloud controllers invoke and manage cloud services, and are further configured to also provide a seamless view of remote cloud services to local client devices. More specifically, a local cloud controller at a given site instantiates and manages access to one or more remote cloud services, thereby allowing local clients to view and access such services as if they were co-located at the site instead of in a separate, remote subnet. Note that the local cloud controller can be configured to perform such operations automatically; such automation allows remote cloud services to be leveraged without involving network administrators or additional network configuration (e.g., without explicitly needing a network administrator to create a new subnet, set up a VPN to the new subnet, and then set up routes to the new subnet). For instance, a cloud controller can be configured to serve as a bridge between the local network and a remote cloud network so that clients and services on both networks operate under an abstraction that they are present on the same subnet.

In some embodiments, cloud controllers create and manage a mapping between local network addresses and remote cloud network addresses; this mapping can be used to determine how to forward local client requests to remote cloud services. Note while the subsequent examples describe several exemplary mapping techniques, a cloud controller may use a range of cloud service management techniques to determine and allocate network addresses for remote cloud services. Furthermore, a range of techniques may be used to instantiate and configure remote cloud services. For instance, in some embodiments remote cloud services may be initiated via a web interface that is also used to manage a cloud controller (e.g., by a local system administrator). In alternative embodiments, some remote cloud services may also be initiated by users and/or administrators via special filesystem actions (e.g., "cloud commands," as described previously) or other mechanisms. Once a remote cloud service has been triggered, the cloud controller will initiate the allocation of any needed resources and the actual instantiation of the remote cloud service.

Figure 6A:
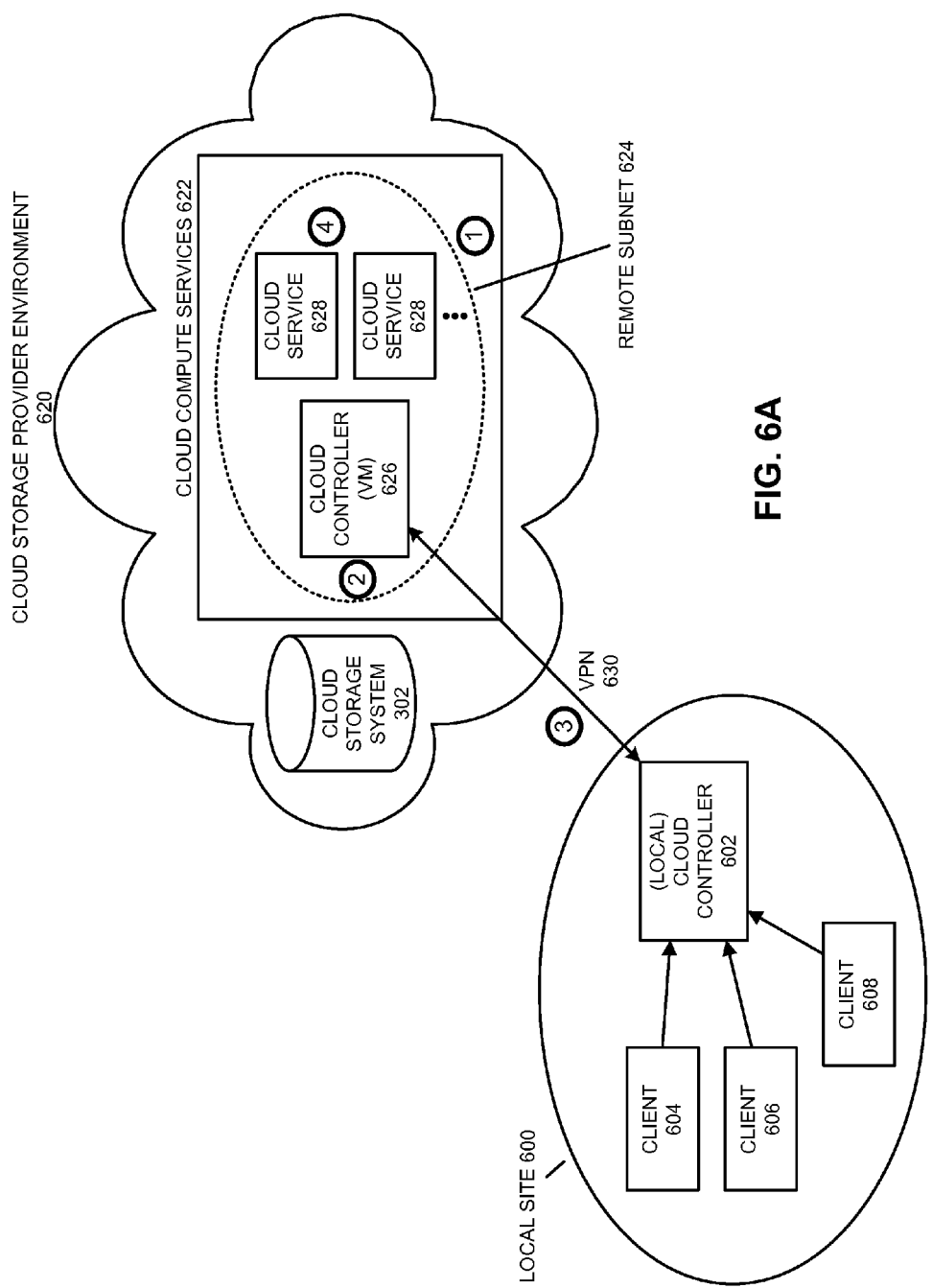
FIG. 6A illustrates an exemplary environment in which a cloud controller configures a bridged subnet that allows clients in the same subnet to seamlessly access remote cloud compute services in accordance with an embodiment.

FIG. 6A illustrates an exemplary environment in which a local cloud controller 602 executing in a local subnet of a local site 600 configures a bridged subnet that allows clients 604-608 in the same subnet to seamlessly access remote cloud compute services 622 (or "cloud services") that execute in a cloud storage provider environment 620 (e.g., a cloud storage and computing environment such as Amazon Web Services (AWS)). During operation, cloud controller 602 receives a request to access a service from one of clients 604-608. In response, cloud controller 602: (1) instantiates a remote subnet 624 of local site 600 in cloud compute services 622 (operation 1); (2) instantiates a remote cloud controller 626 as a virtual machine (VM) that executes in remote subnet 624 (operation 2); (3) initiates and establishes a secure connection between cloud controller 602 and cloud controller 626 (e.g., a VPN 630) (operation 3); and (4) conveys a set of bridge network configuration information to cloud controller 626 (not shown). At this point, either of cloud controllers 602 or 626 can instantiate one or more remote cloud services 628 in remote subnet 624 (operation 4), after which cloud controllers 602 and 626 serve as a bridge between clients 604-608 and any requested services executing in remote subnet 624. Note that in some configurations cloud controller 602 may be a dedicated cloud controller device that is installed at local site 600, while in alternative configurations cloud controller 602 may instead execute as an instantiation of a cloud controller in a virtual machine on a general-purpose computing device that is installed at local site 600.

Figure 6B:
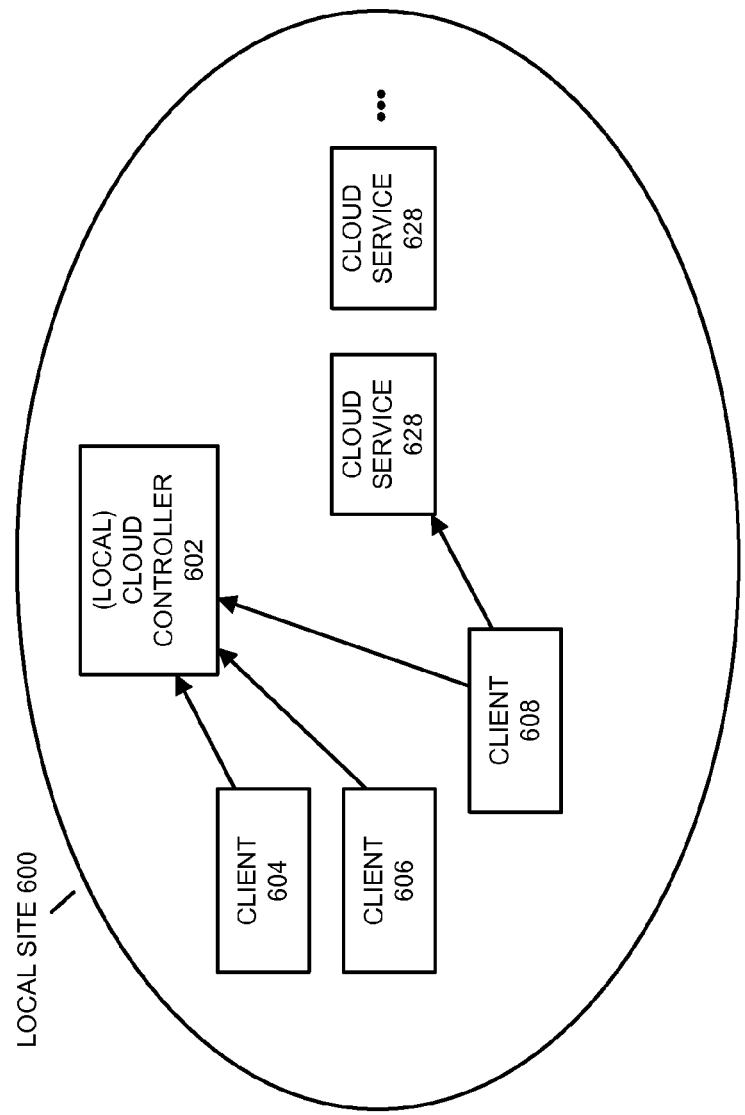
FIG. 6B illustrates the abstraction presented to clients by the cloud controller of FIG. 6A in accordance with an embodiment.

FIG. 6B illustrates the abstraction presented to clients 604-608 by cloud controller 602. Recall that, as described previously, cloud controllers dynamically cache data stored in cloud storage system 302, thereby leveraging cloud storage capabilities to provide clients an abstraction of unlimited local storage. The disclosed remote access techniques provide substantially similar abstractions for cloud services. From the client perspective, cloud services 628 can be accessed directly and seamlessly, as if they were co-located on the physical network at local site 600, without needing to modify or re-configure local clients or incur other additional administrative overhead. Additional cloud services can be instantiated in the cloud storage provider environment (not shown in FIG. 6B) as needed and yet be presented as local resources to users, thereby allowing enterprises to dynamically extend computing capacity as needed based on demand with low overhead and complexity and minimal user confusion.

In one exemplary implementation, instantiating remote subnet 624 involves determining that there is a contiguous address space available in the subnet of local site 600 (e.g., a set of contiguous available IP addresses). In some instances, this may involve cloud controller 602 determining that a portion of the local subnet that has been allocated for such purposes (e.g., a set of address that have been statically reserved or otherwise pre-configured). Alternatively, in some instances this may involve cloud controller 602 scanning its subnet of local site 600 (e.g., pinging every address in the subnet looking for responses), analyzing the set of allocated addresses, and then determining a viable continuous address space. Cloud controller 602 can then "claim" such addresses by responding to ping requests to these addresses, thereby ensuring that no other computing devices (or DHCP servers) attempt to use these addresses. Because local cloud controller 602 is instantiating the virtual machines in cloud compute services 622 (and/or directing how cloud controller 626 instantiates those virtual machines), cloud controller 602 can directly specify which IP addresses these instantiations are associated with.

Consider an exemplary implementation in which local site 600 is a /24 subnet (e.g., an IPv4 network 192.168.5.0 with subnet mask 255.255.255.0). Such networks can be logically sub-divided and broken into a number of smaller subnets. For instance, for a /24 subnet, cloud controller 602 might logically partition off an unused portion of this exemplary /24 address space (e.g., a smaller /28 "sub-subnet" portion of the /24 subnet's address space) and allocate addresses from this sub-subnet to services that are instantiated in remote subnet 624. For example, cloud controller 602 may determine that the /28 0.64 sub-subnet is available, and proceed to allocate addresses 192.168.5.65 through 192.168.5.78 to virtual machines executing in remote subnet 624. Cloud controller 602 then detects requests for those addresses and forwards those requests to remote subnet 624 via VPN 630 and cloud controller 626.

From the viewpoint of computing devices in local site 600 (e.g., clients 604-608), services in remote subnet 624 appear local and can be accessed as if all of the addresses in the /24 subnet (including the /28 sub-subnet) correspond to local devices. Typically, a local device seeking to communicate with another local device that is known to be in the same subnet and has a known IP address but an unknown link layer address (e.g., MAC address) needs to broadcast an ARP request that identifies the target IP address and requests the associated MAC address; traffic for targets known to be outside of the known subnet range are forwarded to the default router for the subnet. If the target is indeed a local computing device, the target can respond to an ARP request directly. However, target virtual devices that are located in remote subnet 624 are not locally present in the same subnet, and hence would not normally receive such ARP requests. Cloud controller 602 can use a range of techniques to address this issue. For instance, in some implementations cloud controller 602 may detect ARP requests referring to any IP addresses in the remote /28 sub-subnet, and respond on their behalf (e.g., perform Proxy-ARP for the remote devices). More specifically, cloud controller 602 can return its own MAC address to the requestor, thereby ensuring that the cloud controller 602 will receive subsequent requests to the target IP address (which cloud controller 602 can then forward to the actual target in remote subnet 624). In this configuration, the physical machines in the /24 subnet at local site 600 will only ever see the MAC address of cloud controller 602 when interacting with the IP addresses of cloud services 628 in remote subnet 624.

Note that while the cloud controllers 602 and 626 perform some routing tasks for traffic that is sent across VPN 630 (e.g., routing traffic between the cloud services and the local physical network), they do not otherwise serve as the default routing gateways for all of the traffic in their respective local subnets. More specifically, remote cloud controller 626, upon being instantiated by cloud controller 602, is configured to route traffic from devices in the greater /24 subnet (e.g., IP addresses that are in the /24 subnet but not in the /28 subnet) to the /28 sub-subnet via the VPN 630 to cloud controller 602. Cloud controller 602 in turn typically only receives from VPN 630 traffic that is destined to devices in the /24 subnet at local site 600, and thus can send an ARP request if needed on its local physical interface to determine the local MAC address associated with target IP addresses for such traffic. For requests that are forwarded by cloud controller 602 to (virtual) cloud controller 626, cloud controller 626 may be configured to add it's own MAC address as the L2 source address, thereby ensuring that replies from cloud services 628 are routed back to cloud controller 626, which can then forward them back to cloud controller 602 and thus local site 600. Devices in the remote subnet 624 can use ARP to determine the MAC addresses associated with other virtual machines in remote subnet 624.

In alternative implementations, cloud controller 602 could instead take on full bridge functionality, and instead forward ARP requests over VPN 630 to remote subnet 624, thereby allowing remote cloud services to respond directly to ARP requests as if they were local to local site 600. Such capabilities may depend on the configuration of the cloud storage provider environment 620; for instance, some cloud environments may include filters that prevent bridging functionality that is based on forwarded ARP requests.

The above-described bridged-subnet technique approach allows typical users to leverage remote services seamlessly, as if they were physically located at the same site. Sophisticated users or applications may, however, be configured to detect the presence of the separate, remote sub-subnet, and be able to take advantage of this knowledge to further optimize operation. For instance, remote services that are instantiated in the cloud storage provider environment can detect the sub-subnet configuration based on their IP address and subnet mask. Select applications executing at the local site may also be configured to detect this configuration and optimize behavior based on specific scenarios. For example, an application that is aware of the remote nature of the cloud services may be configured to determine the network characteristics of the connection between the local site and cloud storage provider environment and use this information to determine whether certain operations should be executed on local computing resources (e.g., physical hardware at the local site) or on cloud compute services.

In the previous example, a cloud controller managed a mapping between local and remote network addresses by allocating a distinct sub-subnet for the remote network and then bridging requests between the local subnet and the remote sub-subnet. While this approach has a number of benefits, it may not always be feasible (e.g., if no contiguous address space of sufficient size is available). For instance, a local cloud controller might instead maintain a table that tracks a set of individual, non-contiguous (e.g., not in a group that can easily grouped as a sub-subnet) IP addresses that are associated with various remote cloud services. Upon determining that an additional cloud service needs to be instantiated, the local cloud controller: (1) finds an available IP address in the local subnet (e.g., using DHCP); (2) instantiates the cloud service as a cloud service in association with that IP address; and (3) adds that IP address to the table of tracked remote services. Subsequently, whenever the cloud controller receives an ARP request for any of the IP addresses in the tracked set, the cloud controller responds (e.g., using proxy-ARP techniques, as described above), thereby ensuring that the cloud controller receives (and can forward) the requests to the corresponding remote service. Bridging multiple individual addresses (instead of a single sub-subnet) may involve a slightly different set of performance and complexity trade-offs depending on the configuration of a given host cloud storage provider's network environment.

Note that the bridging techniques disclosed in the previous examples occur at the link layer (e.g., layer two, or the MAC layer) of the OSI network model, thereby effectively combining the cloud subnet into the existing local subnet (e.g., giving the devices in the two physically-separated networks the abstraction that they are on the same physical subnet). This is in contrast to techniques that operate at layer three (e.g., the IP layer) and route traffic between two separate, independent networks; routing techniques typically require updates to the routing configuration and/or infrastructure so that the independent subnets can communicate with each other.

The abstraction of seamless integration of cloud services into a local subnet that is provided by the above-described techniques enables users to initiate remote operations and leverage cloud resources more easily. For instance, some specific examples of distributed filesystem operations that benefit from cloud compute resources include:

Cloud virus scans: As mentioned previously, file operations that execute directly in the cloud storage provider environment can access the distributed filesystem data from the cloud storage system using high-speed data center networks, and thus can complete with much lower latency (and without consuming valuable enterprise network bandwidth). The above-described techniques could be used to instantiate a remote cloud anti-virus service that periodically scans through all of the data in the distributed filesystem (e.g., accessing the distributed filesystem via a cloud controller that also executes as a cloud compute service); this anti-virus service could be managed and controlled as if it were present within the local network, but actually exist as a remote cloud service that executes in close proximity to the cloud storage system.

Cloud file audit: Consider a remote cloud file audit service that is configured to detect whenever new data is written to the distributed filesystem. This service might monitor files and scan for any changes to documents, and hence would (as described above for cloud virus scans) benefit from executing in close proximity to the cloud storage system. This service could be managed and controlled as if it were present in a local network, but then execute as a remote cloud service.

Cloud content search and indexing: Search and indexing operations also benefit from executing as cloud services that are in close proximity to the cloud storage system. Bridging facilitates presenting a cloud-based search capability as a local service that then actually executes in the cloud storage provider environment, where it can operate more quickly upon the data of the distributed filesystem.

Cloud backup and archive: Operations that retrieve, transform, store and/or remove large amounts of file data from active use would also benefit from being executed as a cloud service that can be locally managed but has high-speed access to the cloud storage system.

Cloud virtual desktop: The above-described bridging techniques could be used to allow a user to initiate a remote desktop to what appears to be another local machine on the same subnet, but is actually a virtual machine that executes as a cloud compute service and accesses a virtual cloud controller that is also executing as a cloud compute service. From this virtual desktop, the user can initiate tasks that involve intensive filesystem access and leverage data center latency and bandwidth instead of being restricted to the potentially limited bandwidth between the user's site and the cloud storage system. Note that multiple users may simultaneously access such cloud virtual desktops, even via different (distributed) cloud storage provider locations; such simultaneous operations may result in simultaneous updates to distributed filesystem data, which are then synchronized across the cloud controllers as described in the previous sections on synchronizing updates for the distributed filesystem.

In summary, bridging remote cloud services facilitate transparently presenting a range of beneficial, high-performance remote file and compute services to local clients.

Figure 9:
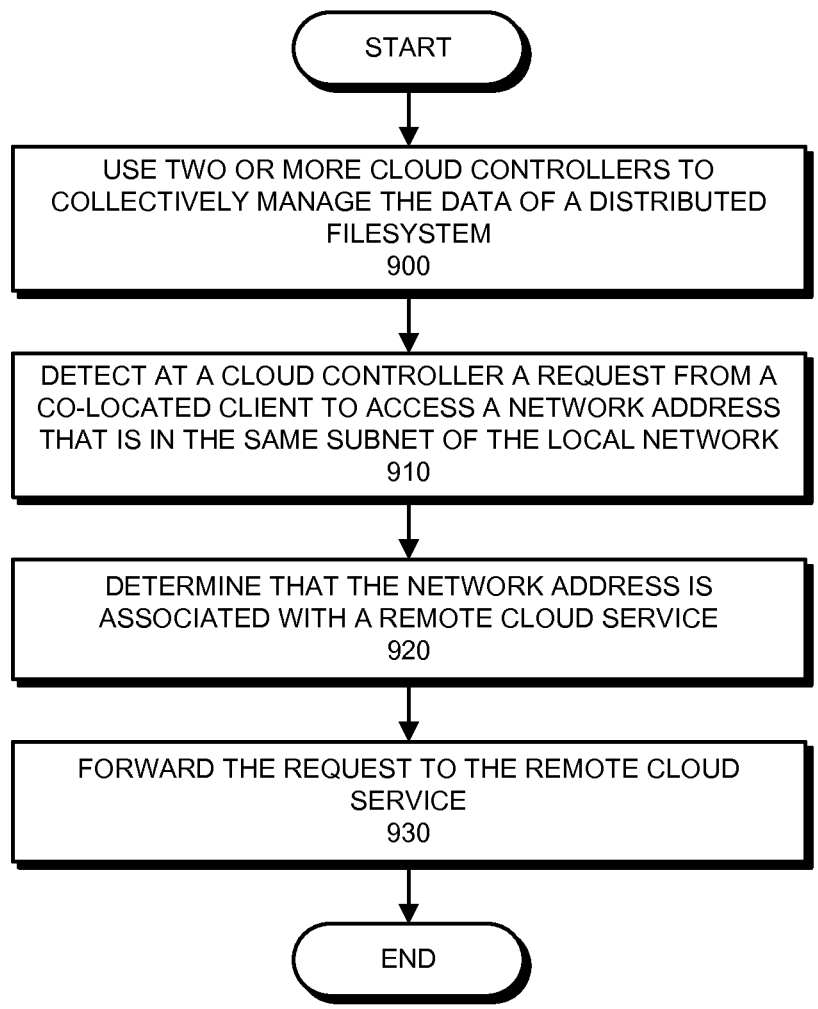
FIG. 9 presents a flow chart that illustrates the process of facilitating access to a remote cloud service via a cloud controller of a distributed filesystem in accordance with an embodiment.

FIG. 9 presents a flow chart that illustrates the process of facilitating access to a remote cloud service via a cloud controller of a distributed filesystem. Two or more cloud controllers collectively manage distributed filesystem data that is stored in the cloud storage systems (operation 900); the cloud controllers ensure data consistency for the stored data, and each cloud controller caches portions of the distributed filesystem. During operation, a cloud controller detects a request from a co-located client to access a network address that is in the same subnet of their local network (operation 910). The cloud controller determines that the network address is associated with the remote cloud service (which executes in a cloud storage environment) (operation 920) and forwards the request to the remote cloud service (operation 930).

Cloud-Controller Impersonation

Figure 7:
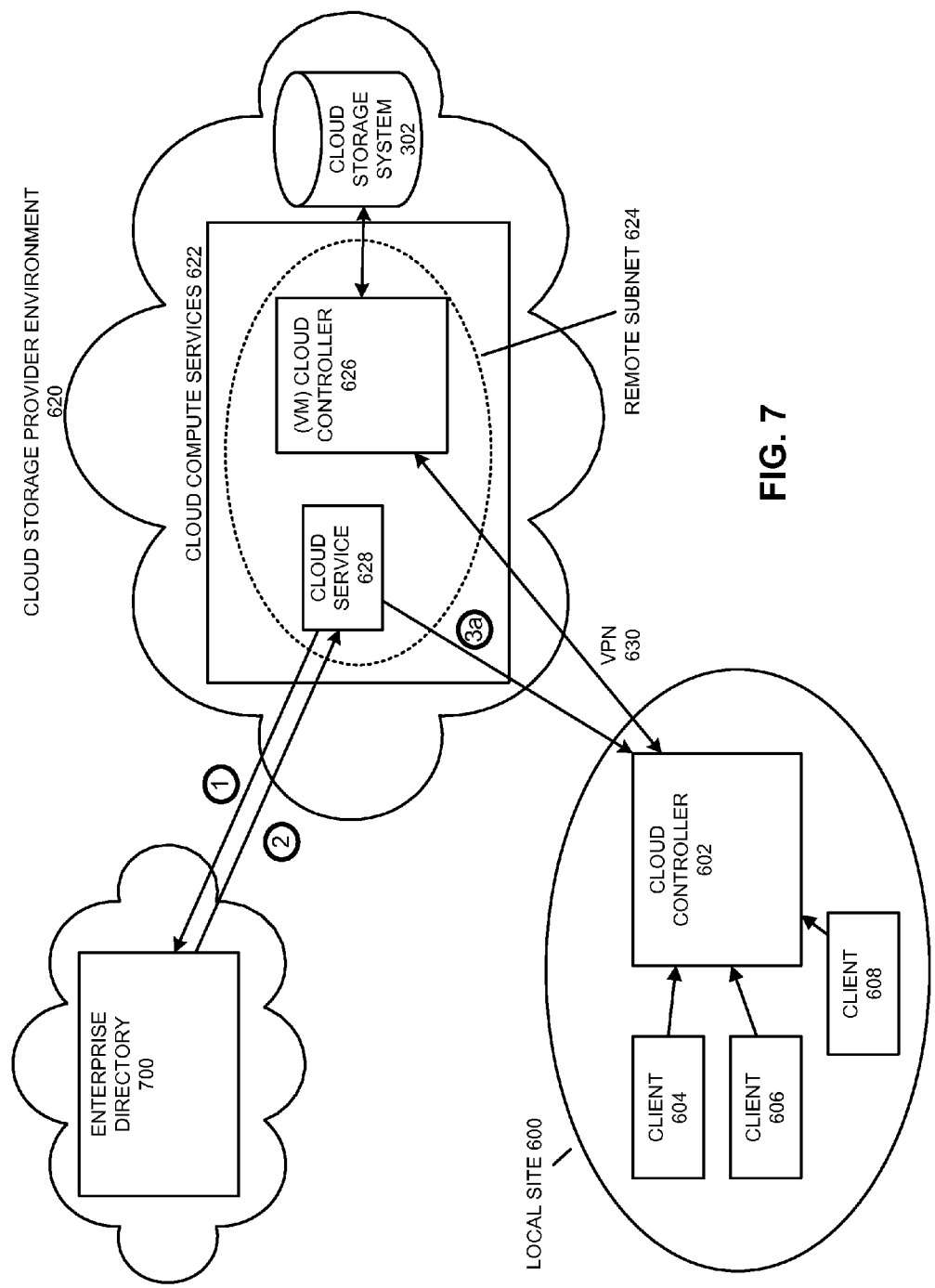
FIG. 7 illustrates a scenario in which a cloud service connects to a sub-optimally-located cloud controller in accordance with an embodiment.

While the above-described bridging techniques facilitate accessing remote cloud services, such techniques can sometimes complicate how cloud-based clients and/or services access a distributed filesystem. FIG. 7 illustrates a scenario that occurs in the context of the previous example of FIG. 6A, in which cloud controller 602 has instantiated remote subnet 624, cloud controller 626, and cloud service 628. In this scenario, newly-instantiated cloud service 628 attempts to connect to the enterprise's (distributed) filesystem, which typically involves sending a request to existing enterprise infrastructure (e.g., a domain controller that tracks the status and locations of all of the enterprise's fileservers, or possibly in the case of a distributed filesystem, cloud controllers). The enterprise infrastructure determines the location of the requestor based on its IP address, and uses this location information to determine and provide the requestor with the IP address of a file server that it determines to be proximate to and/or otherwise appropriate for the requestor. In the context of FIG. 7, cloud service 628 may send a request to access a filesystem share (e.g., a lookup request for "\\<company_name>.com\data") to the enterprise infrastructure (e.g., enterprise directory service 700) (operation 1). However, because the above-disclosed bridging techniques operate at the link layer, most entities are unaware that remote subnet 624 is geographically distributed from local site 600. As a result, because of the bridging, enterprise directory 700 may determine that, based on cloud service 628's IP address, cloud service 628 is located at local site 600 and hence proximate to cloud controller 602. Enterprise directory 700 thus returns the IP address for cloud controller 602 to cloud service 628 (operation 2), resulting in cloud service 628 connecting to cloud controller 602 for file services (operation 3a). This is a sub-optimal arrangement, because cloud service 628 could instead access cloud controller 626, which is co-located in the cloud storage provider environment with cloud service 628 and cloud storage system 302, and hence is likely to provide much higher-speed filesystem access for cloud service 628 than cloud controller 602. Instead, all of cloud service 628's file requests are sent via VPN 630 to cloud controller 602. As a result, the file data being accessed by cloud service 628 may need to be downloaded to cloud controller 602 and local site 600, only to be transferred back via VPN 630 to fulfill cloud service 628's requests. This configuration adds substantial latency to cloud service 628's requests and doubly loads the network connection between local site 600 and cloud storage system 302. Hence, what is needed are techniques that ensure that cloud service 628 connects to (its local) cloud controller 626 instead.

In some embodiments, a cloud controller may be configured to impersonate another cloud controller. More specifically, an impersonating cloud controller may be configured with the same IP address as the cloud controller that is being impersonated, and intercept file access requests intended for the impersonated cloud controller. For instance, when instantiating cloud controller 626, cloud controller 602 can configure cloud controller 626 to impersonate cloud controller 602 (e.g., by assigning it the same IP address as cloud controller 602).

Figure 8:
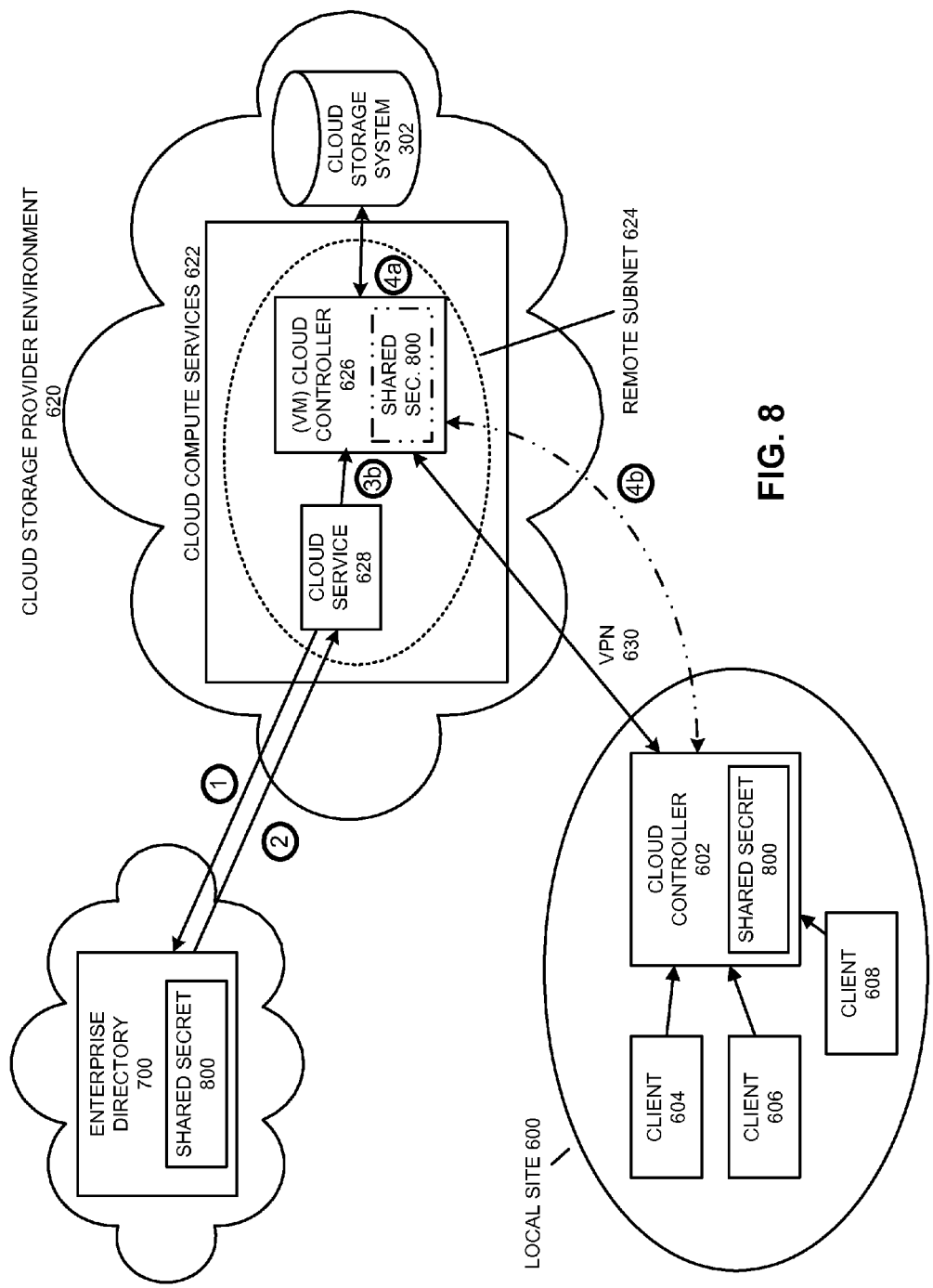
FIG. 8 illustrates a scenario in which a cloud controller impersonates a second cloud controller in accordance with an embodiment.

FIG. 8 illustrates cloud-controller impersonation in the context of the example of FIG. 7. As previously, cloud service 628 sends a request for a filesystem share to enterprise directory 700 (operation 1), and enterprise directory 700 returns the IP address for cloud controller 602 (operation 2). Unlike in the scenario of FIG. 7, however, cloud controller 626 is impersonating cloud controller 602, and the request sent by cloud service 628 to cloud controller 602 is received by cloud controller 626 (operation 3b), which impersonates cloud controller 602 and proceeds to serve file data to cloud service 628. As a result, cloud service 628 benefits from the performance advantages of accessing a local cloud controller (that is co-located with cloud storage system 302), thus avoiding the negative bandwidth and latency issues of the configuration scenario described for FIG. 7.

Note that an impersonating cloud controller may be configured to respond to more than one IP address. For instance, in some configurations an impersonating cloud controller may only be associated with a single IP address (e.g., the IP address of the cloud controller that it is impersonating). In this configuration, the two cloud controllers are logically connected and communicate with each another, but are invisible to each others' respective portions of the subnet; for example, in the example of FIG. 8, cloud controller 602 is invisible to clients and services in remote subnet 624, and remote cloud controller 626 is invisible to clients 604-608 at local site 600. Alternatively, cloud controller 626 may be configured to also be associated with a second, separate IP address (e.g., in remote subnet 624's address space if subnet bridging is being used) that allows it to be addressed individually by clients 604-608 if needed. For instance, this configuration may be beneficial for management, routing, and/or bridging purposes.

While IP-address-based impersonation resolves some of the above-described complications of bridging techniques, typical client/fileserver authentication protocols provide another challenge. When a fileserver (e.g., a cloud controller) first registers to join the enterprise, a shared secret is established between the enterprise infrastructure and the fileserver. A client requesting file services typically needs to authenticate itself to the enterprise infrastructure; upon determining that the client is allowed to access the requested resource, the enterprise infrastructure then uses the shared secret for the suggested fileserver to create a "ticket" (e.g., a set of credentials and/or permissions that are encrypted using the shared secret) that is presented to the client along with the IP address of the suggested fileserver. The client subsequently presents this ticket to the fileserver (e.g., as part of a CIFS connection request), which then: (1) uses the shared secret to decrypt the credentials; (2) confirms from the credentials that the client is indeed an authenticated enterprise user that has been granted permission to connect to the filesystem; and then (3) provides the appropriate level of file services specified by the enterprise infrastructure in the credentials.

In the cloud controller impersonation example of FIG. 8, both enterprise directory 700 and cloud controller 602 possess a shared secret 800 that can be used to facilitate the process of granting file access permissions to cloud service 628. However, if cloud controller 626 is impersonating cloud controller 602, cloud service 628 ends up presenting a ticket that it receives from enterprise directory 700 (in operation 2) to cloud controller 626 instead of cloud controller 602. Hence, to be able to impersonate cloud controller 602 properly, cloud controller 626 needs to either: (1) be given access to shared secret 800, so that cloud controller 626 can also use shared secret 800 to examine the ticket and ensure that cloud service 628 has indeed authenticated itself with enterprise directory 700 and has been granted access to the requested files and file services (operation 4*a*); or (2) forward the ticket to cloud controller 602, which uses shared secret 800 to check that the ticket is valid and, if so, informs cloud controller 626 that cloud service 628 has been authenticated and specifies to cloud controller 626 the permissions that the ticket grants to cloud service 628.

In summary, cloud-controller-impersonation techniques can be used to overcome complications that can arise due to bridging techniques. An impersonating cloud controller may: (1) be configured to use the same IP address as the cloud controller that is being impersonated; (2) be granted access to one or more shared secrets that are associated with the cloud controller that is being impersonated; and/or (3) communicate with the cloud controller that is being impersonated to ensure that filesystem behavior is impersonated correctly.

Computing Environment

In summary, embodiments of the present invention facilitate storing and accessing data in a distributed filesystem. A set of distributed cloud controllers manage data stored in a cloud-based storage system to provide a high-capacity, high-reliability storage system that ensures data consistency. These cloud controllers cache the set of data that is being used by their respective clients, store updates in cloud files on the cloud storage system, and forward updates to each other via incremental snapshots. Additional techniques can be applied to reduce access and propagation delays for files that are being collaboratively edited and/or accessed by remote clients via different cloud controllers. Hence, the disclosed embodiments present an abstraction of one global, extensible filesystem while preserving the abstraction of high-speed local data access.

Figure 4:
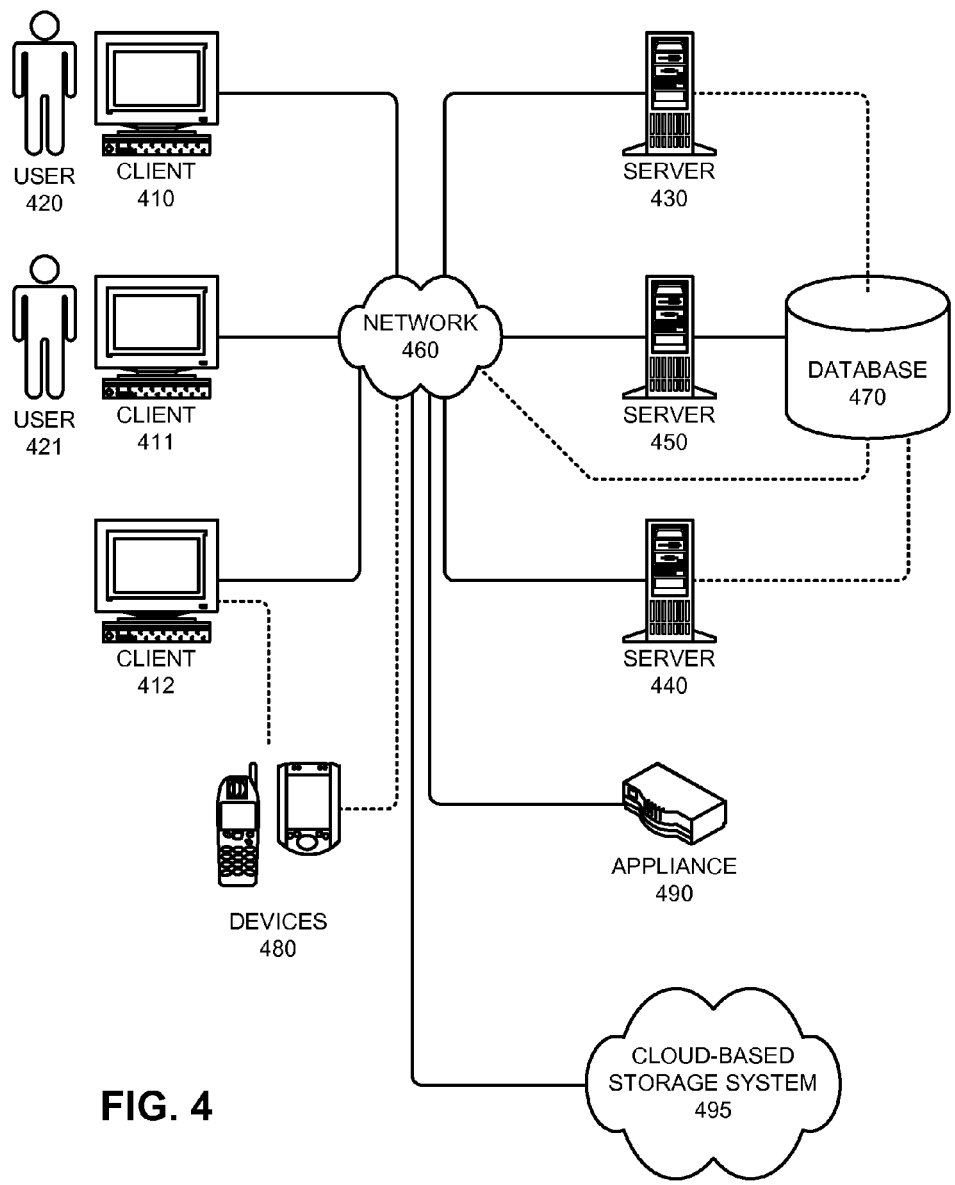
FIG. 4 illustrates a computing environment in accordance with an embodiment.

In some embodiments of the present invention, techniques for managing and/or accessing a distributed filesystem can be incorporated into a wide range of computing devices in a computing environment. For example, FIG. 4 illustrates a computing environment 400 in accordance with an embodiment of the present invention. Computing environment 400 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 4, computing environment 400 includes clients 410-412, users 420 and 421, servers 430-450, network 460, database 470, devices 480, appliance 490, and cloud-based storage system 495.

Clients 410-412 can include any node on a network that includes computational capability and includes a mechanism for communicating across the network. Additionally, clients 410-412 may comprise a tier in an n-tier application architecture, wherein clients 410-412 perform as servers (servicing requests from lower tiers or users), and wherein clients 410-412 perform as clients (forwarding the requests to a higher tier).

Similarly, servers 430-450 can generally include any node on a network including a mechanism for servicing requests from a client for computational and/or data storage resources. Servers 430-450 can participate in an advanced computing cluster, or can act as stand-alone servers. For instance, computing environment 400 can include a large number of compute nodes that are organized into a computing cluster and/or server farm. In one embodiment of the present invention, server 440 is an online "hot spare" of server 450.

Users 420 and 421 can include: an individual; a group of individuals; an organization; a group of organizations; a computing system; a group of computing systems; or any other entity that can interact with computing environment 400.

Network 460 can include any type of wired or wireless communication channel capable of coupling together computing nodes. This includes, but is not limited to, a local area network, a wide area network, or a combination of networks. In one embodiment of the present invention, network 460 includes the Internet. In some embodiments of the present invention, network 460 includes phone and cellular phone networks.

Database 470 can include any type of system for storing data in non-volatile storage. This includes, but is not limited to, systems based upon magnetic, optical, or magneto-optical storage devices, as well as storage devices based on flash memory and/or battery-backed up memory. Note that database 470 can be coupled: to a server (such as server 450), to a client, or directly to a network. Alternatively, other entities in computing environment 400 (e.g., servers 430-450) may also store such data.

Devices 480 can include any type of electronic device that can be coupled to a client, such as client 412. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 480 can be coupled directly to network 460 and can function in the same manner as clients 410-412.

Appliance 490 can include any type of appliance that can be coupled to network 460. This includes, but is not limited to, routers, switches, load balancers, network accelerators, and specialty processors. Appliance 490 may act as a gateway, a proxy, or a translator between server 440 and network 460.

Cloud-based storage system 495 can include any type of networked storage devices (e.g., a federation of homogeneous or heterogeneous storage devices) that together provide data storage capabilities to one or more servers and/or clients.

Note that different embodiments of the present invention may use different system configurations, and are not limited to the system configuration illustrated in computing environment 400. In general, any device that includes computational and storage capabilities may incorporate elements of the present invention.

Figure 5:
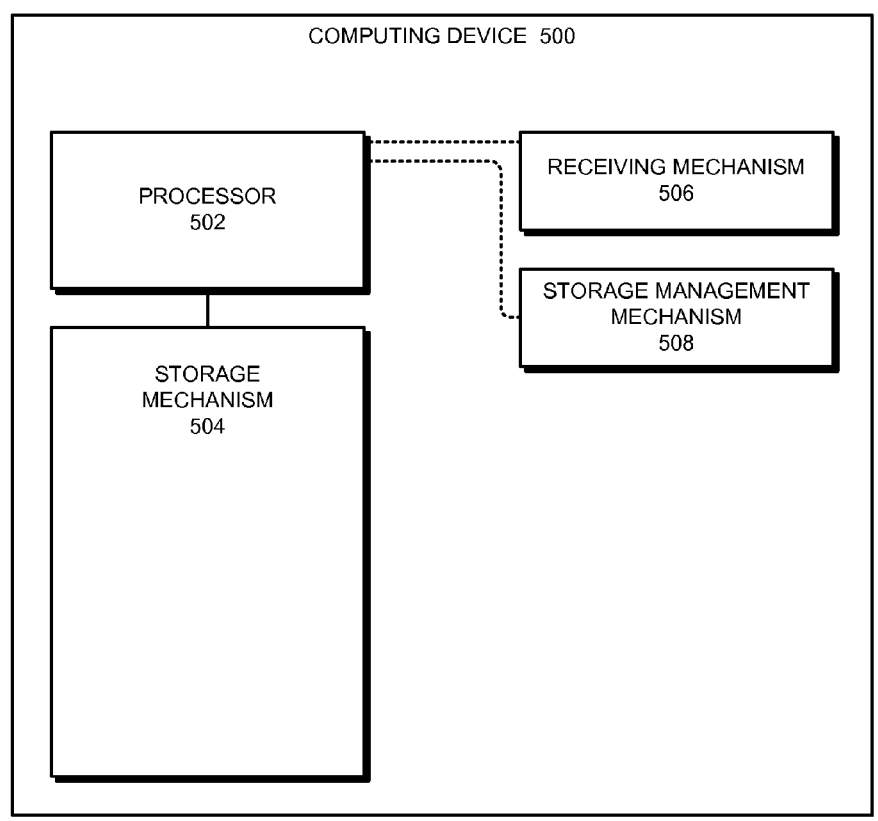
FIG. 5 illustrates a computing device in accordance with an embodiment.

FIG. 5 illustrates a computing device 500 that includes a processor 502 and a storage mechanism 504. Computing device 500 also includes a receiving mechanism 506 and a storage management mechanism 508.

In some embodiments, computing device 500 uses receiving mechanism 506, storage management mechanism 508, and storage mechanism 504 to manage data in a distributed filesystem. For instance, storage mechanism 504 can store metadata for a distributed filesystem, and computing device 500 can use receiving mechanism 506 to receive a request to access a data block for a file. Program instructions executing on processor 502 can traverse the stored metadata to identify a metadata entry that is associated with the data block. Storage management mechanism 508 can use this metadata entry to download a cloud file containing the data block from a cloud storage system.

In some embodiments of the present invention, some or all aspects of receiving mechanism 506, storage management mechanism 508, and/or a filesystem device driver can be implemented as dedicated hardware modules in computing device 500. These hardware modules can include, but are not limited to, processor chips, application-specific integrated circuit (ASIC) chips, field-programmable gate arrays (FPGAs), memory chips, and other programmable-logic devices now known or later developed.

Processor 502 can include one or more specialized circuits for performing the operations of the mechanisms. Alternatively, some or all of the operations of receiving mechanism 506, storage management mechanism 508, and/ or a filesystem device driver may be performed using general-purpose circuits in processor 502 that are configured using processor instructions. Thus, while FIG. 5 illustrates receiving mechanism 506 and/or storage management mechanism 508 as being external to processor 502, in alternative embodiments some or all of these mechanisms can be internal to processor 502.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating access to a remote cloud service for a client of a distributed filesystem, the method comprising:
    collectively managing the data of the distributed filesystem using two or more cloud controllers by performing operations comprising
        storing the data for the distributed filesystem in a cloud storage system, wherein the remote cloud service is co-located with the cloud storage system in a cloud storage environment;
        caching data stored in the cloud storage system in the cloud controllers; and
        ensuring-data consistency for the data stored in the cloud storage system;
    instantiating a remote cloud controller in the cloud storage environment in proximity to the remote cloud service, wherein a local cloud controller and the client are co-located in a local network that is geographically separate from the cloud storage environment;
    assigning the remote cloud service a network address in the subnet of the local network;
    enabling in the local cloud controller a mapping of the network address to the remote cloud service;
    detecting at the local cloud controller a request from the client to access the remote cloud service, wherein the request comprises performing upon the distributed filesystem a data-intensive operation that involves high-data-bandwidth; and
    forwarding the request from the local cloud controller to the remote cloud service, the remote cloud service then performing operations that comprise:
        sending a filesystem access request to access the distributed filesystem to a network directory, wherein the network directory assumes an incorrect location for the remote cloud service by incorrectly determining from the remote cloud service's network address that the remote cloud service is co-located with the local cloud controller in the local network and instructs the remote cloud service to contact the local cloud controller for distributed filesystem access requests; and sending, based on the network directory's response, a file access request to the network address for the local cloud controller, wherein the remote cloud controller: monitors traffic to detect network traffic from the remote cloud service that is addressed to the local cloud controller's network address; detects the file access request destined for the local cloud controller; and impersonates the local cloud controller by intercepting the file access request and then providing file services for the distributed filesystem to the remote cloud service to prevent distributed filesystem requests from the remote cloud service from traversing a network link between the local network and the cloud storage system; and performing the data-intensive operation entirely in the cloud storage environment with high-data-bandwidth local access to the cloud storage system without needing to transfer the distributed filesystem data needed for the data-intensive operation to the local cloud controller, wherein the remote cloud controller impersonates the local cloud controller to reduce network traffic between the local network and the cloud storage system.

2. The computer-implemented method of claim 1,
wherein the remote cloud service is not co-located with the local cloud controller and the client;
wherein forwarding the request from the local cloud controller to the remote cloud service facilitates an abstraction for the client that the remote cloud service is present in the local network and co-located with the local cloud controller and the client; and
wherein the method further comprises configuring the remote cloud service from the client as if the remote cloud service were a local service executing in the local network.

3. The computer-implemented method of claim 1, wherein the one or more cloud storage systems for the distributed filesystem are hosted in the cloud storage environment.

4. The computer-implemented method of claim 3, wherein forwarding the request from the local cloud controller to the remote cloud service further comprises:
establishing a virtual private network (VPN) between the local cloud controller and the remote cloud controller.

5. The computer-implemented method of claim 4, wherein forwarding the request from the local cloud controller to the remote cloud service further comprises:
determining a sub-subnet address space in the subnet of the local network that is not presently being used;
allocating the sub-subnet address space to one or more remote cloud services, wherein the remote cloud service is mapped to a network address in the sub-subnet address space, wherein the local cloud controller performs bridging for the sub-subnet address space; and
upon detecting at the local cloud controller a request sent to the sub-subnet address space, forwarding the request to the remote cloud controller, wherein the remote cloud controller forwards the request to the remote cloud service.

6. The computer-implemented method of claim 5, wherein detecting the request at the local cloud controller further comprises:

detecting at the local cloud controller an address resolution protocol (ARP) request for the network address; and
sending the link layer address for the local cloud controller in response to the ARP request for the network address to ensure that subsequent requests to the remote cloud service are directed to the local cloud controller.

7. The computer-implemented method of claim 4, wherein forwarding the request from the local cloud controller to the remote cloud service further comprises:
determining an available network address in the subnet of the local network; and
allocating the available network address to the remote cloud service, wherein the local cloud controller maintains a mapping between network addresses in the local network that are associated with remote cloud services;
upon detecting at the local cloud controller a request sent to the network address, forwarding the request to the remote cloud controller, wherein the remote cloud controller forwards the request to the remote cloud service.

8. The computer-implemented method of claim 4,
wherein returning the network address for the local cloud controller to the remote cloud service further comprises returning an authentication identifier for the filesystem access request from the network directory to the remote cloud service;
wherein the local cloud controller and the network directory are configured to share a shared secret;
wherein the local cloud controller shares the shared secret with the remote cloud controller; and
wherein the remote cloud controller is configured to use the shared secret to decrypt and validate the authentication identifier.

9. The computer-implemented method of claim 4,
wherein returning the network address for the local cloud controller to the remote cloud service further comprises returning an authentication identifier for the filesystem access request from the network directory to the remote cloud service;
wherein the local cloud controller and the network directory are configured to share a shared secret;
wherein the remote cloud controller is configured to send the authentication identifier to the local cloud controller; and
wherein the local cloud controllers uses the shared secret to decrypt and validate the authentication identifier and send the decrypted authentication identifier to the remote cloud controller.

10. A non-transitory computer-readable storage medium storing instructions that when executed by a computer cause the computer to perform operations for facilitating access to a remote cloud service for a client of a distributed filesystem, the operations comprising:
collectively managing the data of the distributed filesystem using two or more cloud controllers by performing operations that comprise:
storing the data for the distributed filesystem in a cloud storage system, wherein the remote cloud service is co-located with the cloud storage system in a cloud storage environment;
caching data stored in the cloud storage system in the cloud controllers; and
ensuring data consistency for the data stored in the cloud storage system;
instantiating a remote cloud controller in the cloud storage environment in proximity to the remote cloud service, wherein a local cloud controller and the client are co-located in a local network that is geographically separate from the cloud storage environment;
assigning the remote cloud service a network address in the subnet of the local network;
enabling in the local cloud controller a mapping of the network address to the remote cloud service;
detecting at the local cloud controller a request from the client to access the remote cloud service, wherein the request comprises performing upon the distributed filesystem a data-intensive operation that involves high-data-bandwidth; and
forwarding the request from the local cloud controller to the remote cloud service, the remote cloud service then performing operations that comprise:
sending a filesystem access request to access the distributed filesystem to a network directory, wherein the network directory assumes an incorrect location for the remote cloud service by incorrectly determining from the remote cloud service's network address that the remote cloud service is co-located with the local cloud controller in the local network and instructs the remote cloud service to contact the local cloud controller for distributed filesystem access requests; and
sending, based on the network directory's response, a file access request to the network address for the local cloud controller, wherein the remote cloud controller:
monitors traffic to detect network traffic from the remote cloud service that is addressed to the local cloud controller's network address; detects the file access request destined for the local cloud controller; and impersonates the local cloud controller by intercepting the file access request and then providing file services for the distributed filesystem to the remote cloud service to prevent distributed filesystem requests from the remote cloud service from traversing a network link between the local network and the cloud storage system; and
performing the data-intensive operation entirely in the cloud storage environment with high-data-bandwidth local access to the cloud storage system without needing to transfer the distributed filesystem data needed for the data-intensive operation to the local cloud controller, wherein the remote cloud controller impersonates the local cloud controller to reduce network traffic between the local network and the cloud storage system.

11. The non-transitory computer-readable storage medium of claim 10,
wherein the remote cloud service is not co-located with the local cloud controller and the client;
wherein forwarding the request from the local cloud controller to the remote cloud service facilitates an abstraction for the client that the remote cloud service is present in the local network and co-located with the local cloud controller and the client; and
wherein the method further comprises configuring the remote cloud service from the client as if the remote cloud service were a local service executing in the local network.

12. The non-transitory computer-readable storage medium of claim 10, wherein the one or more cloud storage systems for the distributed filesystem are hosted in the cloud storage environment.

13. The non-transitory computer-readable storage medium of claim 12, wherein forwarding the request from the local cloud controller to the remote cloud service further comprises:
instantiating a remote cloud controller in the cloud storage environment;
establishing a virtual private network (VPN) between the local cloud controller and the remote cloud controller; and
instantiating the remote cloud service in the cloud storage environment.

14. The non-transitory computer-readable storage medium of claim 13, wherein forwarding the request from the local cloud controller to the remote cloud service further comprises:
determining a sub-subnet address space in the subnet of the local network that is available;
allocating the sub-subnet address space to one or more remote cloud services, wherein the remote cloud service is allocated a network address in the sub-subnet address space, wherein the local cloud controller performs bridging for the sub-subnet address space; and
upon detecting at the local cloud controller a request sent to the sub-subnet address space, forwarding the request to the remote cloud controller, wherein the remote cloud controller forwards the request to the remote cloud service.

15. The non-transitory computer-readable storage medium of claim 14, wherein detecting the request at the local cloud controller further comprises:
detecting at the local cloud controller an address resolution protocol (ARP) request for the network address; and
sending the link layer address for the local cloud controller in response to the ARP request for the network address to ensure that subsequent requests to the remote cloud service are directed to the local cloud controller.

16. The non-transitory computer-readable storage medium of claim 13, wherein forwarding the request from the local cloud controller to the remote cloud service further comprises:
determining an available network address in the subnet of the local network; and
allocating the available network address to the remote cloud service, wherein the local cloud controller maintains a mapping between network addresses in the local network that are associated with remote cloud services;
upon detecting at the local cloud controller a request sent to the network address, forwarding the request to the remote cloud controller, wherein the remote cloud controller forwards the request to the remote cloud service.

17. A cloud controller that facilitates access to a remote cloud service for a client of a distributed filesystem, comprising:
a processor;
a storage device, wherein the processor stores metadata and cached data for the distributed filesystem in the storage device; and
a non-transitory computer readable memory containing instructions that when executed by the processor cause the cloud controller to:
collectively manage the data of the distributed filesystem in conjunction with one or more other cloud controllers by performing operations that comprise:
storing the data for the distributed filesystem in a cloud storage system, wherein the remote cloud service is co-located with the cloud storage system in a cloud storage environment;

caching data stored in the cloud storage system in the cloud controllers; and ensuring data consistency for the data stored in the cloud storage system;

instantiate a remote cloud controller in the cloud storage environment in proximity to the remote cloud service, wherein the cloud controller and the client are co-located in a local network that is geographically separate from the cloud storage environment;

assign the remote cloud service a network address in the subnet of the local network;

enable in the cloud controller a mapping of the network address to the remote cloud service;

detect a request from the client to access the remote cloud service, wherein the request comprises performing upon the distributed filesystem a data intensive operation that involves high data bandwidth; and forward the request from the cloud controller to the remote cloud service, the remote cloud service then performing operations that comprise:

sending a filesystem access request to access the distributed filesystem to a network directory, wherein the network directory assumes an incorrect location for the remote cloud service by incorrectly determining from the remote cloud service's network address that the remote cloud service is co-located with the cloud controller in the local network and instructs the remote cloud service to contact the cloud controller for distributed filesystem access requests; and sending, based on the network directory's response, a file access request to the network address for the cloud controller, wherein the remote cloud controller:

monitors traffic to detect network traffic from the remote cloud service that is addressed to the cloud controller's network address; detects the file access request destined for the cloud controller; and impersonates the cloud controller by intercepting the file access request and then providing file services for the distributed filesystem to the remote cloud service to prevent distributed filesystem requests from the remote cloud service from traversing a network link between the local network and the cloud storage system; and performing the data intensive operation entirely in the cloud storage environment with high data bandwidth local access to the cloud storage system without needing to transfer the distributed filesystem data needed for the data intensive operation to the cloud controller, wherein the remote cloud controller impersonates the cloud controller to reduce network traffic between the local network and the cloud storage system.

18. The computer-implemented method of claim 1, wherein the method further comprises:

receiving at the local cloud controller a broadcast ARP request from the client, wherein the broadcast ARP request requests a MAC address that is associated with the network address and the remote cloud service;

wherein the local cloud controller is not the destination requested by the broadcast ARP request but detects the request for the network address on behalf of a geographically remote cloud service and returns the local cloud controller's MAC address in response to the broadcast ARP request despite the local cloud controller not being the requested target address, thereby ensuring that all local requests for the remote cloud service that are sent in the local network are received by the local cloud controller.

19. The computer-implemented method of claim 1, wherein the client is aware of the remote nature of the remote cloud service and servicing the client request involves determining the network characteristics of the connection between the local network and the cloud storage system and using the determined network characteristics to determine based on the capacity of the network link and the compute capabilities available in the local network environment whether to execute an operation that leverages the distributed filesystem locally in the local network environment or via the remote cloud service.

20. The computer-implemented method of claim 1, wherein the remote cloud service is a remote cloud file audit and indexing service;

wherein the client invokes the remote cloud service when writing large quantities of new or modified data to the distributed filesystem;

wherein the remote cloud service uses cloud computing resources available in proximity to the cloud storage system to detect and scan through the modified distributed filesystem data and ensure that the new data is not malicious and perform indexing on the new data.

* * * * *